United States Patent
Wyckoff et al.

(10) Patent No.: US 6,663,109 B1
(45) Date of Patent: Dec. 16, 2003

(54) ROTATING FLUID SEAL

(75) Inventors: John M. Wyckoff, Redwood City, CA (US); Deuel A. Batsford, San Carlos, CA (US); Joseph A. Cassisi, Sunnyvale, CA (US)

(73) Assignee: Kennedy/Jenks Consultants, Palo Alto, CA (US)

( * ) Notice: Subject to any disclaimer, the term of this patent is extended or adjusted under 35 U.S.C. 154(b) by 0 days.

(21) Appl. No.: 09/710,198

(22) Filed: Nov. 10, 2000

Related U.S. Application Data

(60) Provisional application No. 60/165,258, filed on Nov. 12, 1999.

(51) Int. Cl.$^7$ .............................. F16J 15/32; F16J 15/00
(52) U.S. Cl. ...................... 277/549; 277/345; 277/553; 277/555; 277/903
(58) Field of Search .................................. 277/345, 500, 277/549, 551, 553, 555, 903, 585, 586, 587, 588, 589; 137/580

(56) References Cited

U.S. PATENT DOCUMENTS

| | | | | |
|---|---|---|---|---|
| 2,708,106 A | * | 5/1955 | Grames | 165/9 |
| 3,951,819 A | | 4/1976 | Shaffer et al. | |
| 4,111,439 A | * | 9/1978 | Schmidt | 277/553 |
| 4,193,877 A | * | 3/1980 | Lillywhite | 210/520 |
| 4,405,137 A | * | 9/1983 | Webb | 277/553 |
| 4,811,961 A | * | 3/1989 | Williams | 277/545 |
| 4,961,588 A | * | 10/1990 | Brienza | 277/545 |
| 5,219,470 A | * | 6/1993 | Bradley et al. | 210/520 |
| 5,462,290 A | * | 10/1995 | Alday | 277/379 |
| 5,911,241 A | | 6/1999 | Roberts | |
| 6,073,935 A | * | 6/2000 | Larumbe | 277/435 |

FOREIGN PATENT DOCUMENTS

GB                1 436 699         *  5/1976

* cited by examiner

Primary Examiner—Lloyd A. Gall
Assistant Examiner—Michael J. Kyle
(74) Attorney, Agent, or Firm—Townsend & Townsend & Crew LLP

(57) ABSTRACT

A rotating seal assembly, comprising: a first member having a circular hole passing therethrough; a second member having a circular shape, the second member being positioned such that an annular gap is present between the first and second members; a contacting member spanning across the annular gap, the contacting member being mounted to one or the other of the first and second members; at least one support assembly disposed on one of the first or second members, the at least one support assembly being mounted to the same member as the contacting member; and a sealing ring, wherein the support assembly holds the sealing ring against the contacting member, thereby pushing the contacting member against the opposite member to which the support assembly is attached.

22 Claims, 11 Drawing Sheets

ROTATING FLUID SEAL

CROSS-REFERENCES TO RELATED APPLICATIONS

This application claims the benefit of priority from U.S. Provisional Patent Application No. 60/165,258, filed Nov. 12, 1999, the full disclosure of which is incorporated herein by reference.

TECHNICAL FIELD

The present invention relates to systems for providing a fluid a seal between a rotating and a stationary portion of a fluid container.

BACKGROUND OF THE INVENTION

Circular clarifier systems and other large diameter process equipment are important in water treatment, wastewater treatment and mining. In some existing circular clarifier systems, a rotating sludge removal mechanism typically includes a series of pipes which rapidly remove sludge from the bottom of the clarifier. In such sludge removal systems, sludge removal pipes are used to draw the sludge up from the bottom of the clarifier tank and then discharge the sludge to a circular chamber, referred to as a "launder", which typically includes both a rotating portion and a stationary portion. The rotating portion is typically connected to the sludge removal pipes which rotate around the bottom of the clarifier, and the stationary portion is typically connected to a discharge pipe from which the sludge is pumped away from the clarifier for disposal or further processing. Essentially, such a "launder" typically resembles an annular shaped fluid drum.

An example of such an existing sludge removal system is seen in U.S. Pat. No. 3,951,819 to Shaffer et al., entitled Sludge Removal System. FIG. 1 is a simplified sectional side elevation view of such a system, and FIG. 2 is a simplified top plan view of such a system. As can be seen in FIGS. 1 and 2, system 10 comprises a launder 12 having an outer rotating portion 12A and a central stationary portion 12B. As can also be seen, water level L1 (outside of launder 12) is higher than water level L2 (inside of launder 12). This differential water level (i.e.: L1–L2) provides the force to cause the sludge to flow from the bottom of the clarifier up through conduits 14, and into launder 12. Specifically, water pressure is created by L1 being higher than L2 such that fluid flows upwardly through conduits 14 (entering at end 13 and exiting into launder 12 through end 15). As such, sludge which has settled to the bottom of clarifier 10 is essentially siphoned from the bottom of the clarifier tank, and is then removed from the clarifier through discharge conduit 18. As portion 12A of the launder rotates in direction R, conduits 14 also rotate in direction R, thereby siphoning sludge from the bottom of the clarifier in a circular fashion. (In a typical clarifier system, a plurality of conduits 14, each having their ends 13 disposed at different radial distances from the center of the clarifier, are used to siphon sludge across the entire bottom surface of the clarifier).

As can be appreciated, a problem with this existing clarifier systems is the problem of providing an effective fluid seal between outer rotating portion 12A and a central stationary portion 12B of launder 12. Specifically, existing clarifier launder seals have tended to suffer from numerous deficiencies, including poor sealing efficiency and rapid wear and tear of the sealing surfaces, due to the fact that center portion 12A of the clarifier launder remains stationary as the outer portion 12B rotates therearound. As it is necessary that water level L2 in launder 12 be kept lower than water level L1 in the rest of clarifier 10, it is necessary to maintain an effective seal between the stationary portion 12B and the rotating portion 12A of launder 12.

FIG. 3 shows a sectional elevation view of a typical existing sealing system 20 adapted for use between rotating portion 12A and stationary portion 12B of launder 12. System 20 comprises a flat horizontal flexible strip 22 which may by annular (or circular) in shape such that it extends across and seals gap 33. Typically flexible strip 22 is made of an elastomer (for example, rubber) which is bent at its outer perimeter by about 90 degrees between inner end 21 and outer perimeter 23. Flexible strip 22 will tend to bounce back or straighten itself such that end 23 pushes against edge 24 of rotating portion 12B of launder 12. As such, flexible strip 22 will thus provide a seal between rotating portion 12B and stationary portion 12A of launder 12. As can be seen, a circular hose 26 can be held in position by a plurality of hose clips 28 to provide further support to flexible strip 22.

Flexible strip 22 deflects to accommodate limited relative lateral motion in direction L between the rotating 12B and fixed 12A portions of launder 12. Unfortunately, the amount of such lateral motion in direction L that can be accommodated is quite limited (typically to fraction of an inch, even for a large diameter seal). Moreover, the rubber portion of the seal (i.e.: flexible strip 22) tends to deteriorate over time and eventually fail. Deterioration of this seal reduces the motive force for sludge withdrawal and dilutes the sludge, reducing the overall clarifier performance.

SUMMARY OF THE INVENTION

The present invention provides a fluid seal assembly, which in preferred aspects prevents movement of fluid through an annular gap between an inner edge of a circular hole passing through a first member and a second member having a circular outer perimeter.

As such, the present system is ideally suited for use in wastewater treatment clarifier launders. Specifically, in preferred aspects, the present invention provides a seal which substantially restricts or prevents fluid movement through an annular gap between the rotating and stationary portions of a wastewater clarifier launder. However, the application of the present invention is not so limited. Rather, the present invention can be used to provide a fluid seal across an annular gap between any two members, including any system wherein the first and second members are rotatably positionable with respect to one another.

In various aspects, the present invention can be used to provide a seal across an annular gap between a first and a second member wherein the first member is rotated while the second member remains stationary; or wherein the second member is rotated while the first member remains stationary; or wherein the first and second members are rotated, but at different speeds or in different directions.

In a first aspect of the invention, a first contacting member is positioned to span across the gap, with the first contacting member being attached to either one or the other of the first and second members. A plurality of support assemblies are attached to the same member to which the contacting member is attached. These support assemblies are specifically adapted to bias the first contacting member into contact against the other member to which the contacting member is not attached.

Various modifications are possible. For example, the first contacting member and the various support assemblies may together be attached to the member disposed on either the inner or the outer edges of the gap (i.e.: attached to either the first or second members).

In preferred aspects, the various support assemblies comprise a biasing mechanism, a pivot member and a sealing support assembly. The sealing support assembly pivots about the pivot member with the biasing mechanism urging the sealing support assembly against the first contacting member. This is turn either urges the first contacting member directly against the member to which the first contacting member is not attached, or alternatively, the first contacting member is urged directly against a second contacting member (which is positioned between the first contacting member and the member to which the first contacting member is not attached).

Preferably, the first contacting member, and the optional second contacting member are made of a suitably tough but flexible low friction material, which may optionally include ultra-high molecular weight polyethylene. When a second contacting member is not used, the member to which the first contacting member is not attached (i.e.: the member which the first contacting member is instead biased against) is preferably made of a suitably tough but flexible low friction material, which may optionally include ultra-high molecular weight polyethylene.

Accordingly, in a first aspect of the invention, the first contacting member pushes against, and slides along the surface of, the member to which the first contacting member is not attached. In a second aspect of the invention, the first contacting member pushes against, and slides along the surface of a second contacting member which is attached to the member to which the first contacting member is not attached.

DESCRIPTION OF THE SPECIFIC EMBODIMENTS

The present invention provides an effective seal between two portions of a fluid tank which are moving with respect to one another. In a preferred aspect, the present invention can be used to provide a seal between a stationary and a moving part of a waste water clarifier launder. It is to understood, however, that the present invention is not so limited. For example, the present invention can be used to provide a rotating fluid seal between two portions of a fluid tank, and especially between two portions of a fluid tank in which one of the portions is moving relative to another.

Figure 4:
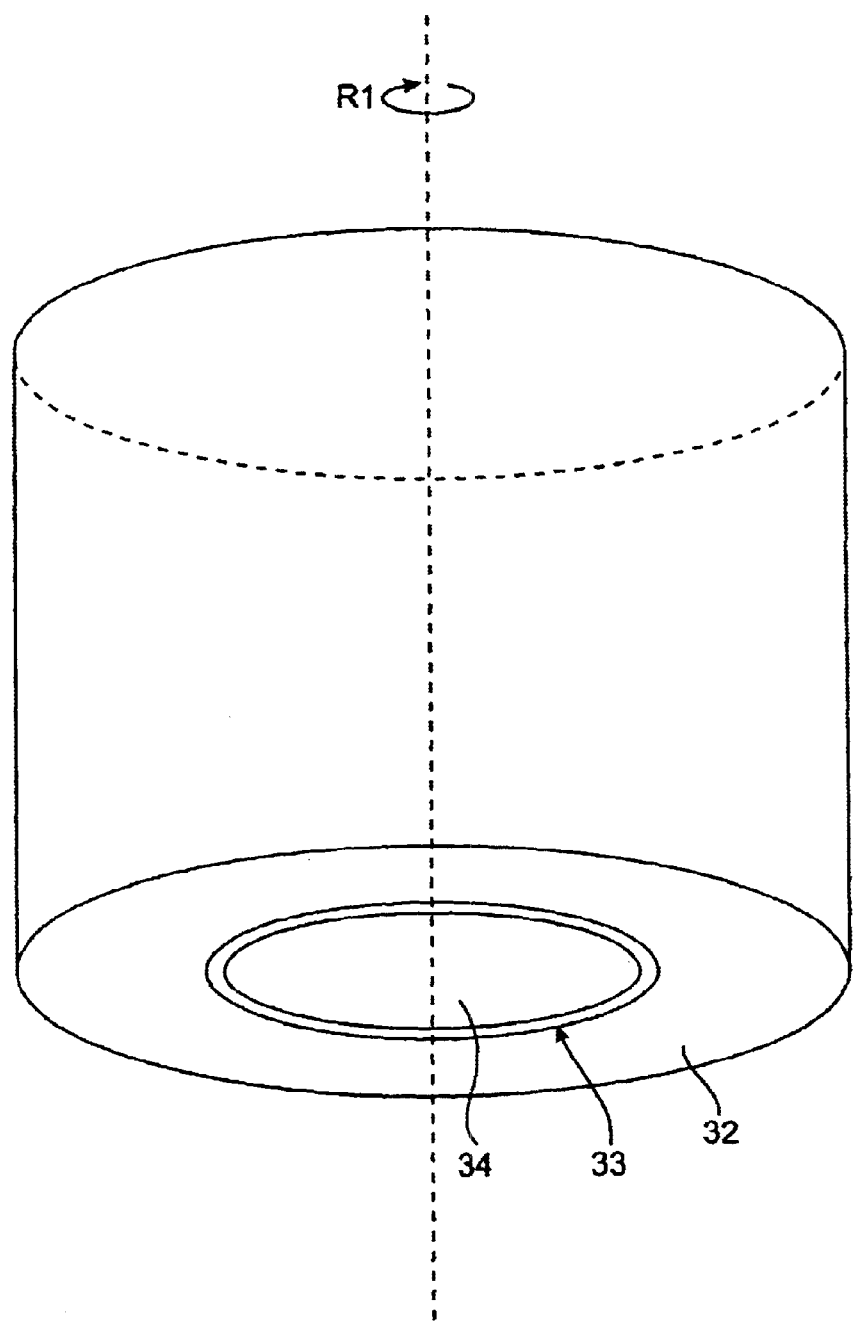
FIG. 4 is a bottom perspective view of a fluid launder having stationary and rotating portions, showing the gap therebetween.
Figure 5:
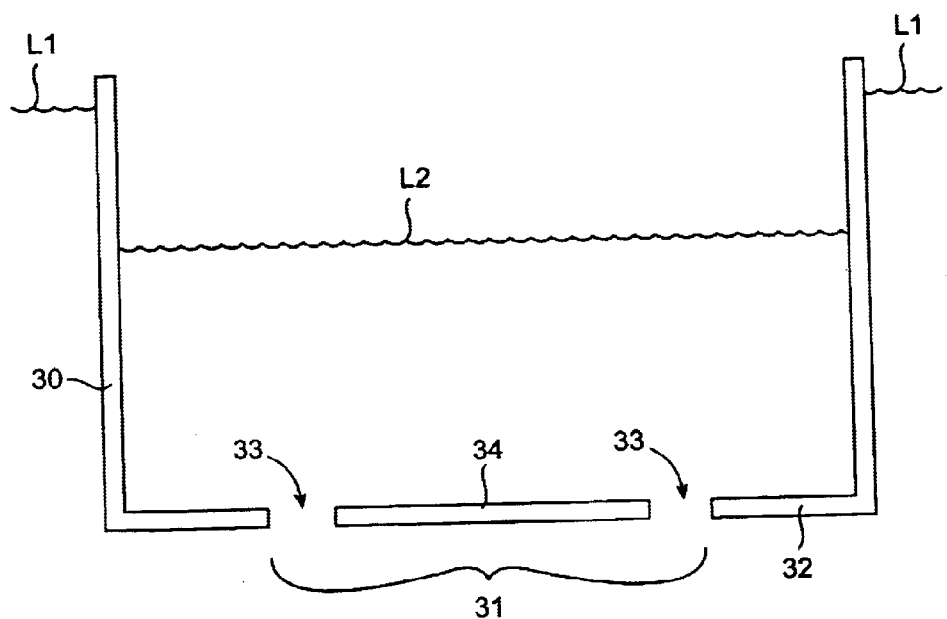
FIG. 5 is a sectional elevation view of fluid launder having stationary and rotating portions, showing the gap therebetween.

FIGS. 4 and 5 set forth an example of a fluid tank 30 having an annular gap 33 in its bottom surface which may be sealed by the system of the present invention. In a preferred aspect, fluid tank 30 may comprise a clarifier launder, but is not so limited.

Fluid tank 30 has a bottom wall 32 with a relatively large center hole 31 passing therethrough. A disc 34 which is slightly smaller in diameter than hole 31 is positioned within hole 31 such that disc 34 is co-planar with bottom wall 32 as shown. As can be seen, an annular gap 33 exists between the outer edge of disc 34 and the inner edge of hole 31 through bottom wall 32.

In various aspects of the operating the present invention, tank 30 may be rotated in direction R1 while disc 34 remains stationary, or vise versa. In addition, both tank and disc 34 may be rotated at the same time with tank 30 rotated in a direction opposite to disc 34, or both tank 30 and disc 34 may be rotated at the same time in the same direction, but at different speeds. Moreover, when neither tank 30 nor disc 34 is being rotated, the present invention still provides a fluid seal covering gap 33.

The present invention is ideally directed to sealing gap 33 between bottom wall 32 and disc 34 such that fluid cannot pass through gap 33, as follows.

Figure 6A:
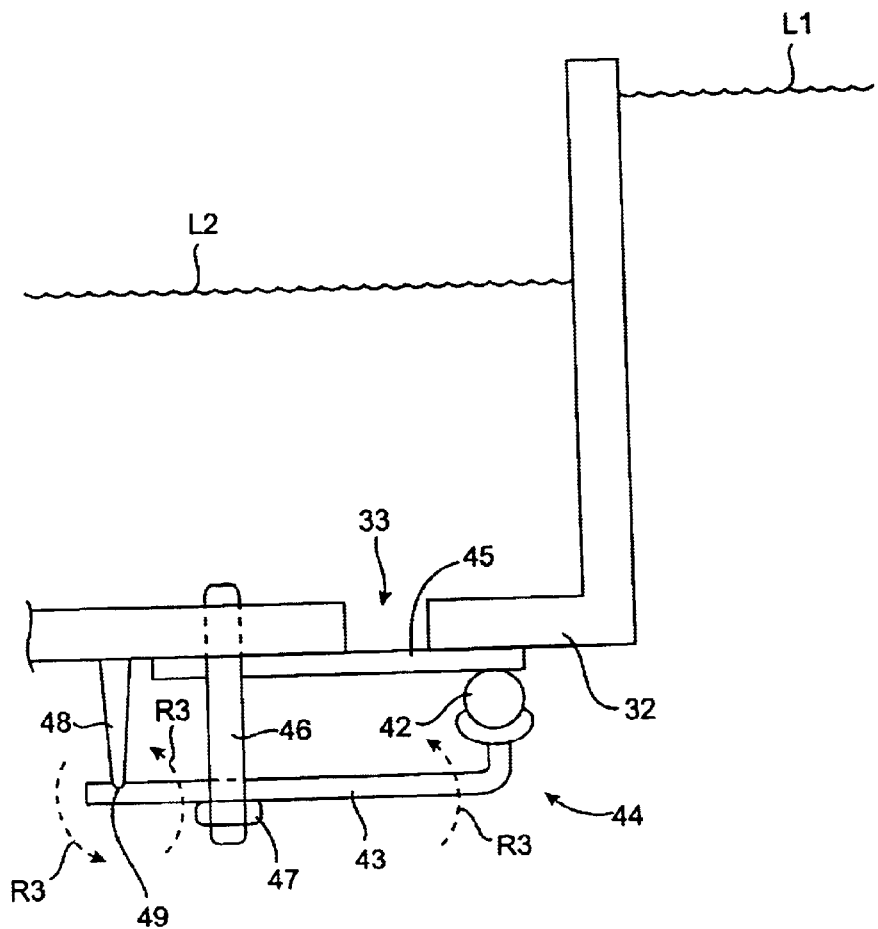
FIG. 6A is a sectional elevation close up view of one side of a fluid seal according to the present invention.
Figure 6B:
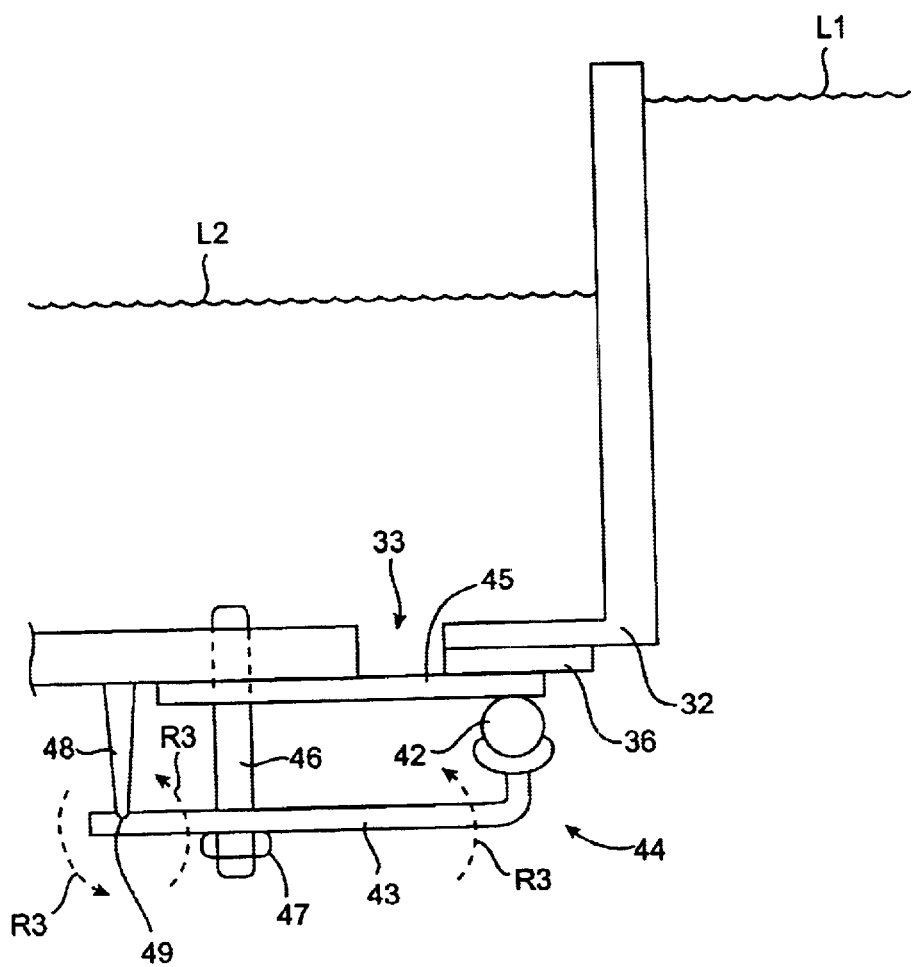
FIG. 6B is a view similar to FIG. 6A, but further including an optional second contacting member positioned between the first contacting member and the member to which the first contacting member is not attached.
Figure 7:
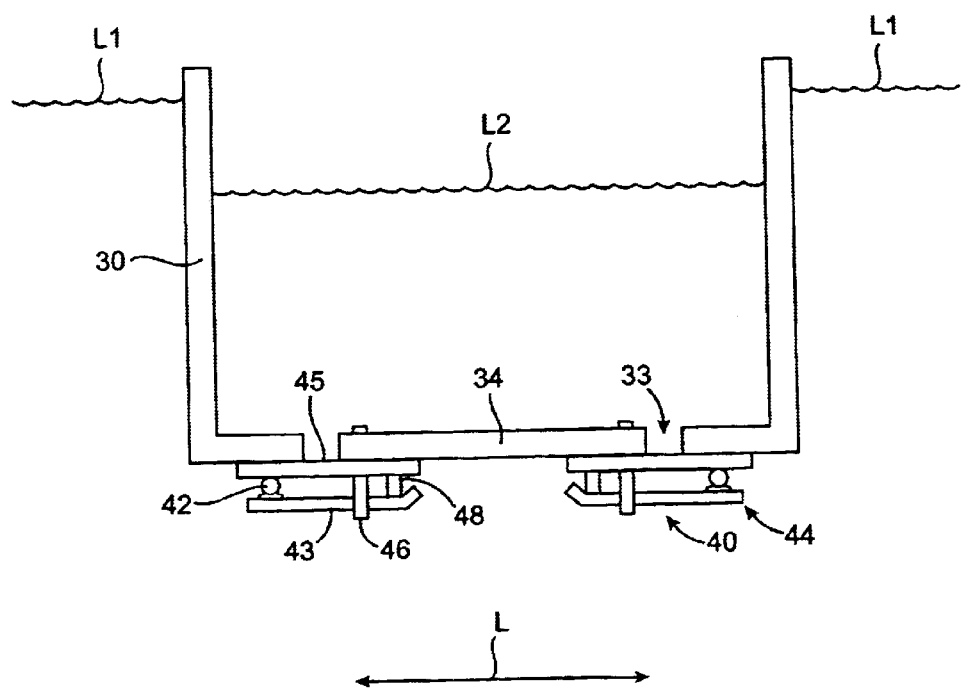
FIG. 7 is a sectional elevation view of a fluid seal according to the present invention.
Figure 8:
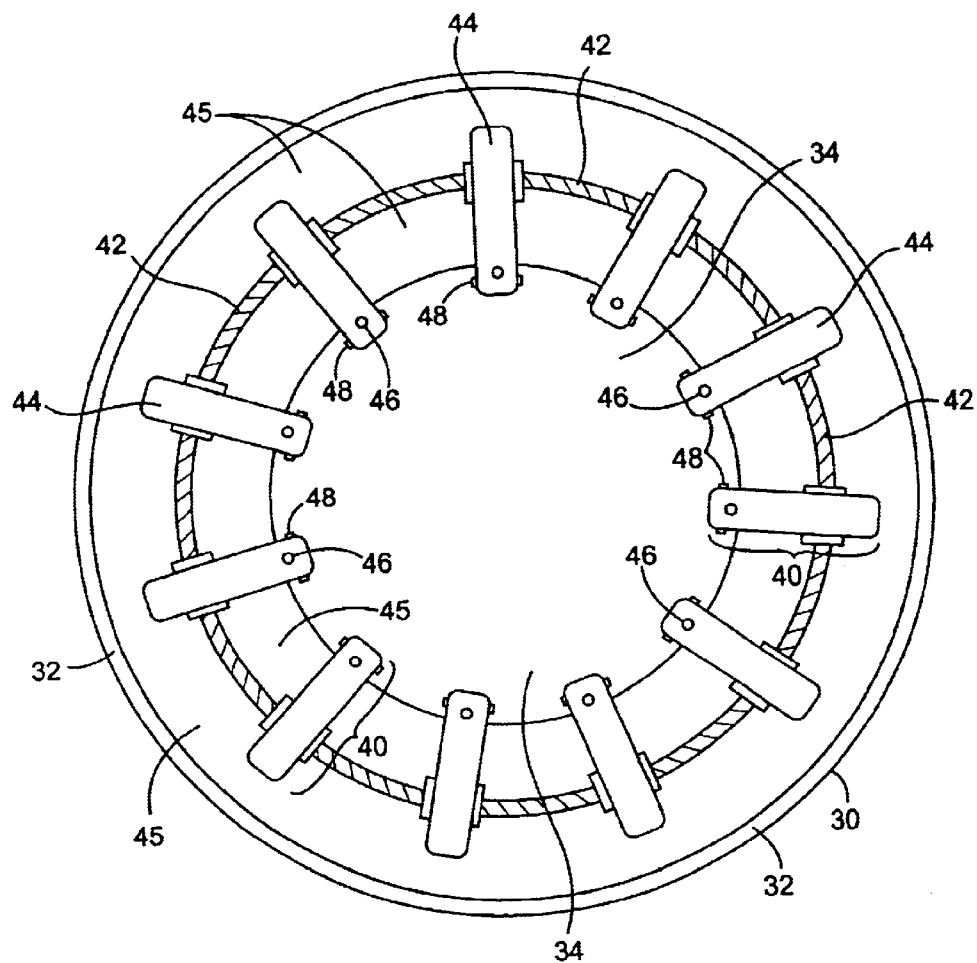
FIG. 8 is a bottom plan view of the fluid seal of FIG. 5.

As shown in FIGS. 6 to 8, a fluid seal assembly 40 is provided. Fluid seal assembly 40 preferably comprises a first member (e.g.: bottom wall 32) having a circular hole 31 passing therethrough; a second member (e.g. disk 34) having a circular outer perimeter positioned such that gap 33 is present between the outer perimeter of second member 34 and an inner edge of the circular hole 31 passing through first member 32.

A first contacting member 45 (which may comprise an annular shaped structure, as shown in FIG. 8) is positioned to span across gap 33. In accordance with the present invention, first contacting member 45 is biased against (and slides across the surface of) bottom wall 32 as shown in FIG. 6A. As can be seen, first contacting member 45 is attached to first member 34, and is biased into contact against first member 32 by biasing mechanism 46 causing support assembly 44 to pivot about pivot 48 (in direction R3) such that support assembly 44 causes a ring 42 to push against first contacting member 45 such that contacting member 45 pushes against bottom wall 32, thereby sealing fluid movement through gap 33.

In this aspect of the invention, the surface of first contacting member 45 and tank bottom wall 32 should both be fabricated of a tough, yet flexible low friction material which may, by way of example, include ultra-high molecular weight polyethylene (UHMW). An advantage to such material is that it offers minimal friction when these parts of the present system rotate against one another. Moreover, such low friction properties are enhanced when the contacting surface between first contacting member 45 and tank bottom 32 are moistened.

In an alternate aspect of the invention, as shown in FIG. 6B, a second contacting member 36 is instead attached directly to bottom wall 32. In this second aspect of the invention, first contacting member 45 is biased against (and slides across the surface of) second contacting member 36. As can be seen, first contacting member 45 is attached to first member 34, and is biased into contact against second contacting member 36 by biasing mechanism 46 causing support assembly 44 to pivot in direction R3 about pivot point 49 of flange/pivot 48 such that support assembly 44 causes a ring 42 to push against first contacting member 45 such that contacting member 45 pushes against second contacting member 36, thereby sealing fluid movement through gap 33.

In this aspect of the invention, the surface of first contacting member 45 and second contacting member 36 should both be fabricated of a tough, yet flexible low friction material which may, by way of example, include ultra-high molecular weight polyethylene (UHMW). An advantage to such material is that it offers minimal friction when these parts of the present system rotate against one another. Moreover, such low friction properties are enhanced when the contacting surface between first contacting member 45 and second contacting member 36 are moistened.

Figure 9:
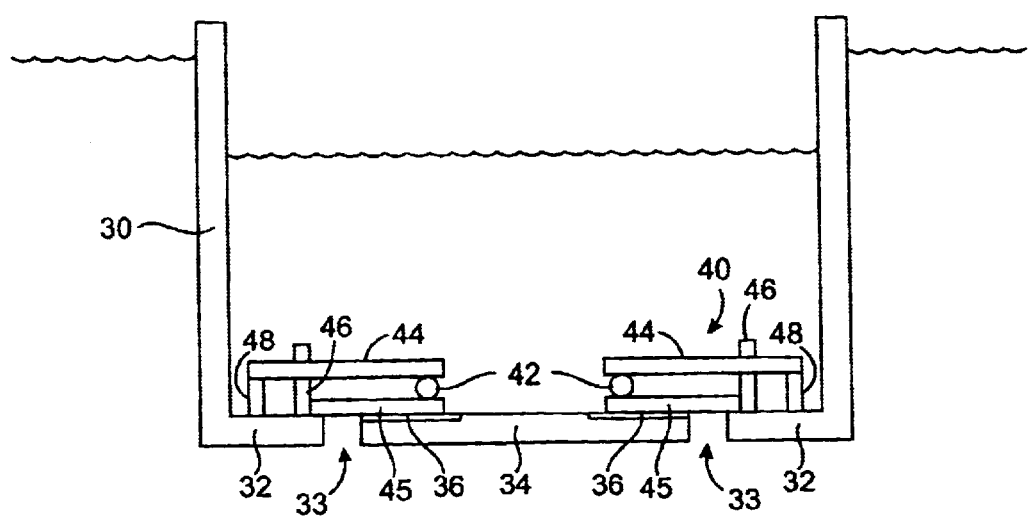
FIG. 9 is a cross-sectional view of another embodiment of the present invention.

Various modifications are possible. For example, as shown in FIG. 9, first contacting member 45, biasing mechanisms 46, pivots 48 and support assemblies 44 may instead be attached to bottom wall 32 (with optional second contacting member 36 attached to disc 34). Moreover, sealing assemblies 40 may be disposed within fluid tank 30, as shown. However, the placement shown in FIG. 7 is believed desirable as the water pressure caused by fluid height L1–L2 will tend to push first contacting member 45 against bottom wall 32 (or second contacting member 36), thereby helping to seal gap 33.

In various aspects, biasing mechanism 46 may be either a spring mechanism or an adjustable force (e.g.: screw tightened) nut and bolt mechanism. For example, by tightening nut 47 of biasing mechanism 46, support assembly 44 (which is held in position by nut 47) is rotated about point 49 in direction R3 to push tightly against first contacting member 45, thereby forcing a tighter seal between first contacting member 45 and bottom wall 32 (FIG. 6A) or second contacting member 36 (FIG. 6B).

An advantage of having biasing mechanism 46 adjustable is that the degree of friction between contacting plate 45 and tank bottom 32 (or second contacting member 36) can be adjusted by tightening, providing an adjustable strength seal across gap 33. Over time, should either contacting plate 45 or tank bottom 32 (or second contacting member 36) tend to deform or become worn away, biasing mechanism 46 may be tightened such that member 44 pushes ring 42 against first contacting member 45, such that the same strength of seal can be maintained, thus compensating for wear in either of contacting plate 45 or tank bottom 32 (or second contacting member 36) over time.

Support assemblies 40 may preferably comprise a cantilever portion 43 and a ring 42, however, the present invention is not so limited. Rather, ring 42 may be removed with cantilever portion 43 directly contacting, and pushing against, first contacting member 45. Moreover, ring 42 may alternately comprise a single ring extending around the circumference of the seal, or a plurality of sections which may, or may not, extend continuously around the circumference of the seal.

Moreover, first contacting member 45 may either comprise a single annular shaped member, or alternatively, first contacting member 45 may comprises a plurality of sections which, when placed together end to end, form an annular shaped member. As such, a further advantage of the present system is that the entire seal can be built of curved segments, (ie: first contacting member 45 may comprise a plurality of "C"-shaped sections, with each section having one or more individual seal assemblies 40 attached thereto), so that very large diameter seals can easily be constructed.

Similarly, optional second contacting member 36 may either comprise a single annular shaped member, or alternatively, optional second contacting member 36 may comprises a plurality of sections which, when placed together end to end, form an annular shaped member.

Figure 10:
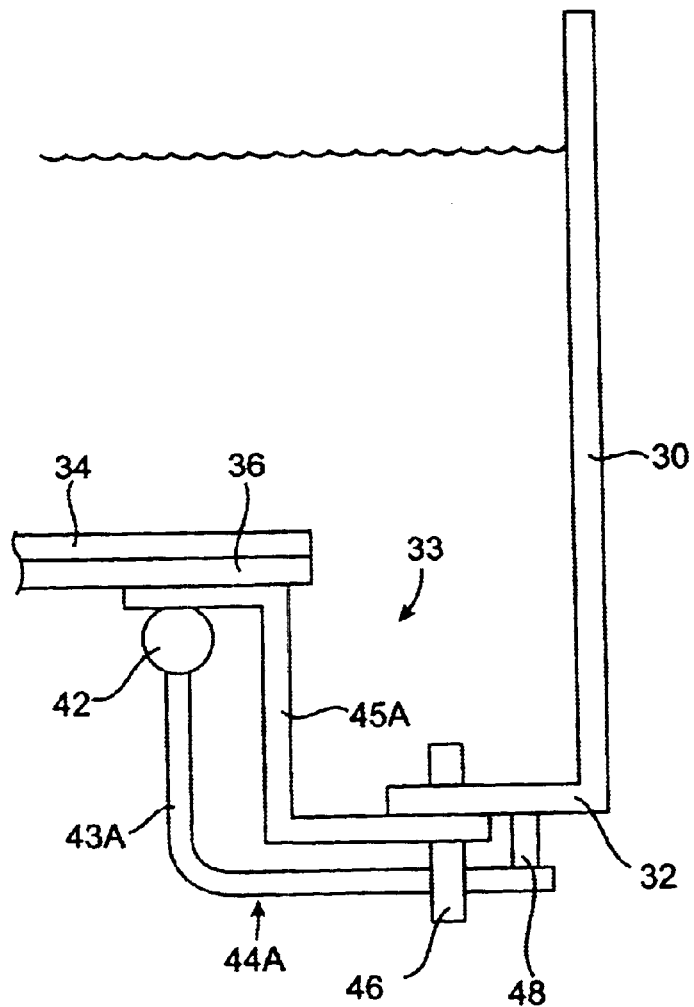
FIG. 10 is a cross-sectional view of yet another embodiment of the present invention.

In another optional aspect of the invention, as shown in FIG. 10, disc 34 and tank bottom wall 32 need not be co-planar with one another. In this aspect of the invention first contacting member 45A and cantilever portion 43A (of support assembly 44A) are "Z"-shaped, being angled to span across gap 33.

Figure 1:
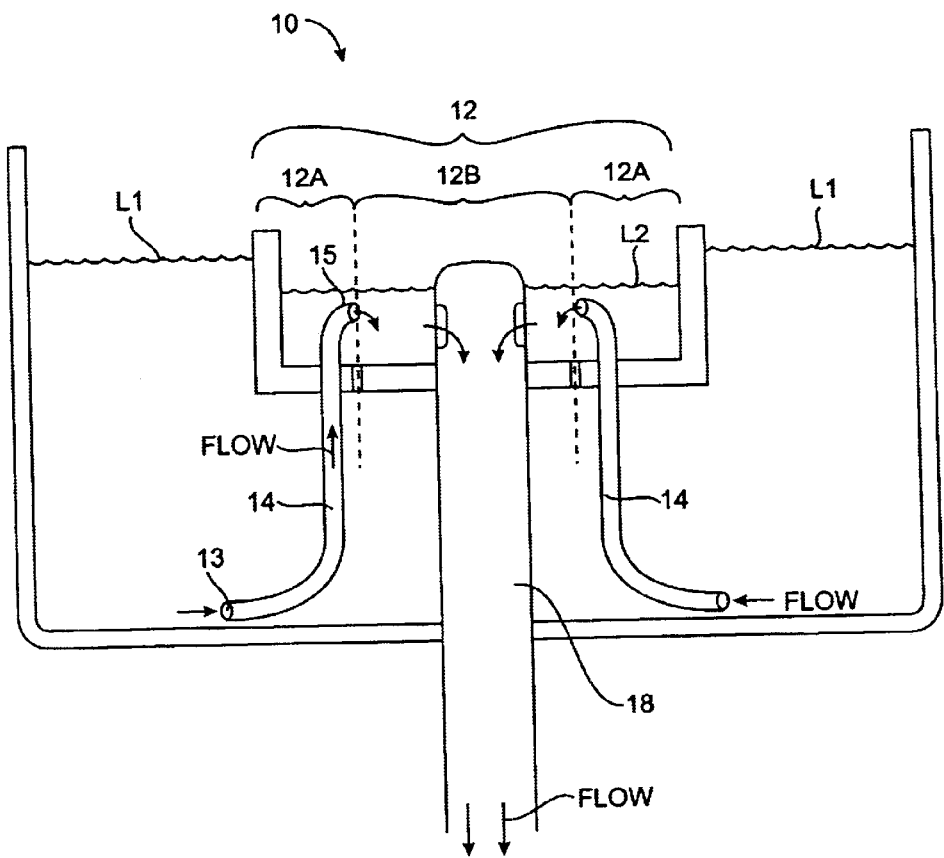
FIG. 1 is a sectional side elevation view of a prior art clarifier center column sludge launder system (taken along line 1—1 in FIG. 2).
Figure 2:
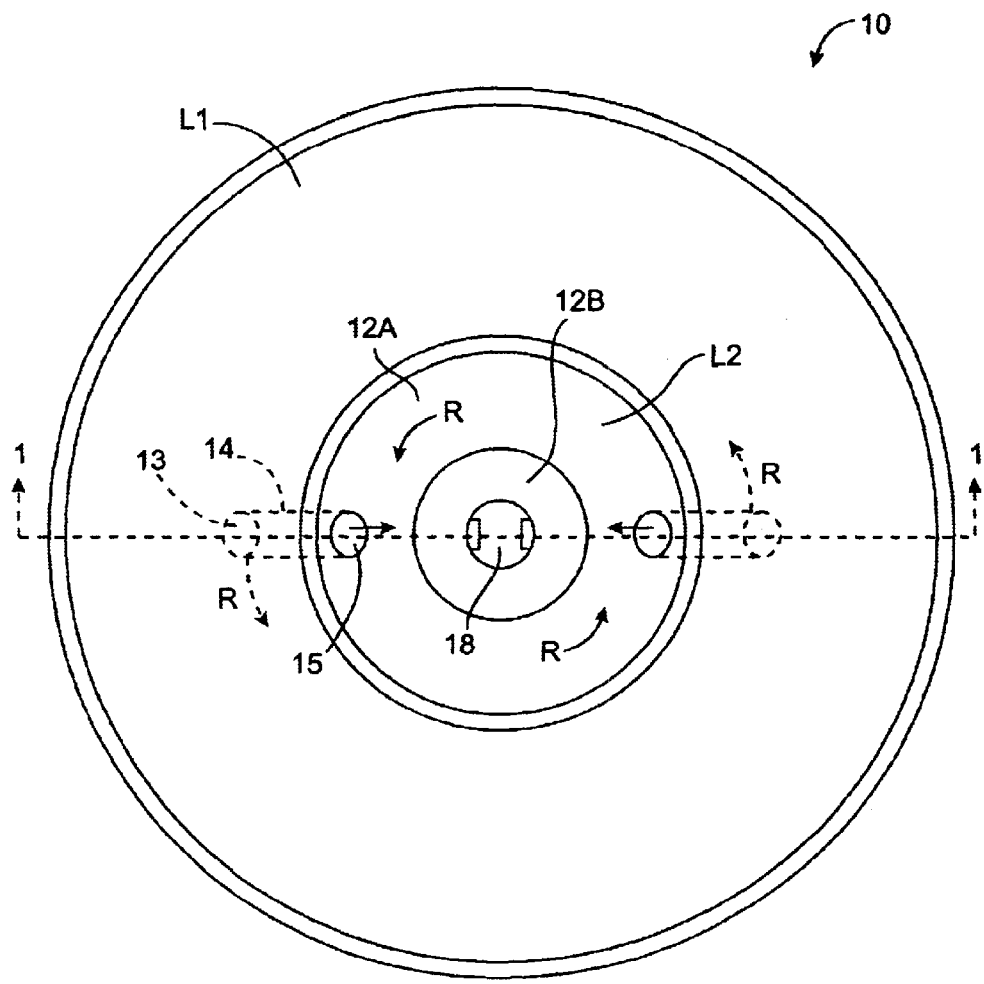
FIG. 2 is a top plan view of the prior art clarifier center column sludge launder system of FIG. 1.
Figure 3:
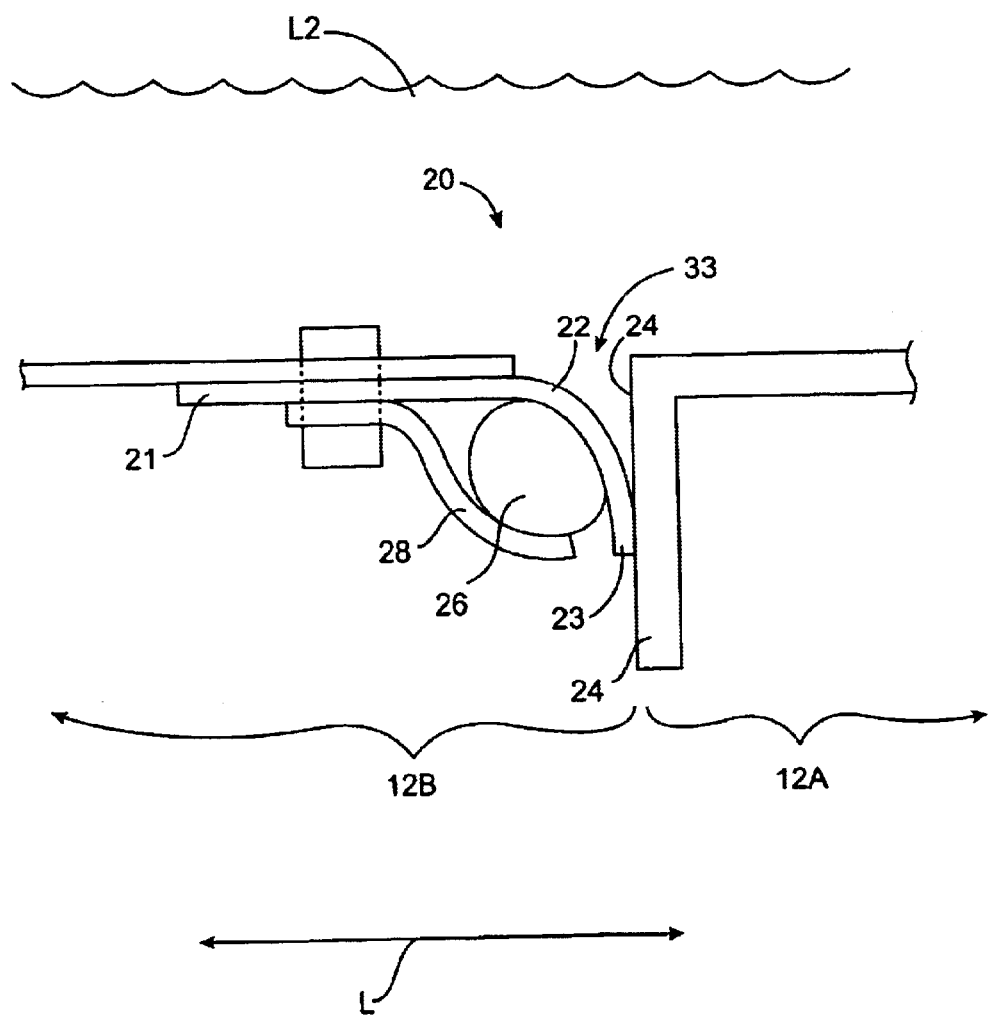
FIG. 3 shows a sectional elevation view of one side of a typical existing clarifier launder seal.

A further advantage of the present system is that disc 34 may move laterally back and forth in direction L such that a much greater degree of side-to-side motion can be accommodated in the present system than in an existing clarifier launder seal (for example, as shown in FIG. 3).

In the case of rapid sludge removal clarifiers, seals can typically be 5-feet to 20-feet in diameter. An advantage of the present invention is that it has proven necessary to bias cantilever portion 43 of support assembly 44 by bending it by only a very small angle, (on the order of 0–5°), to maintain a seal across gap 33. Therefore, the two flat horizontal disc surfaces (first contacting member 45 and tank bottom 32 or second contacting member 36) seal one against the other with only a minimal flexing of the sealing surfaces.

What is claimed is:

1. A fluid seal assembly, comprising:
    a first member having a circular hole passing therethrough;
    a second member having a circular outer perimeter, the second member being positioned such that a gap is present between the outer perimeter of the second member and an inner edge of the circular hole passing through the first member;
    a substantially planar first contacting member spanning across the gap, the first contacting member being attached to only one or the other of the first and second members;
    a plurality of support assemblies attached to the same member to which the first contacting member is attached, the support assemblies biasing the first contacting member against the member to which the contacting member is not attached;
    wherein each support assembly comprises:
        a biasing mechanism attached to the same member to which the first contacting member is attached;
        a pivot member attached to the same member to which the first contacting member is attached; and
        a sealing support assembly connected to the biasing mechanism and positioned to pivot about the pivot member, wherein the biasing mechanism biases the sealing support assembly against the second member.

2. A fluid seal assembly, comprising:
    a first member having a circular hole passing therethrough;
    a second member having a circular outer perimeter, the second member being positioned such that a gap is present between the outer perimeter of the second member and an inner edge of the circular hole passing through the first member;

a first contacting member spanning across the gap, the first contacting member being attached to only one or the other of the first and second members;

a second contacting member attached to the other of the first and second members to which the first contacting member is not attached; and a plurality of support assemblies attached to the same member to which the first contacting member is attached, the support assemblies biasing the first contacting member against the second contacting member.

3. The fluid seal assembly of claim 2, wherein the first contacting member and the support assemblies are attached to the first member.

4. The fluid seal assembly of claim 2, wherein the first contacting member and the support assemblies are attached to the second member.

5. The fluid seal assembly of claim 2, wherein each support assembly comprises:

a biasing mechanism attached to the same member to which the first contacting member is attached;

a pivot member attached to the same member to which the first contacting member is attached; and a sealing support assembly connected to the biasing mechanism and positioned to pivot about the pivot member, wherein the biasing mechanism biases the sealing support assembly against the second contacting member.

6. The fluid seal assembly of claim 5, wherein the biasing mechanism comprises:

an adjustable force biasing mechanism.

7. The fluid seal assembly of claim 5, wherein the biasing mechanism comprises:

a spring biasing mechanism.

8. The fluid seal assembly of claim 2, wherein the gap is annular in shape.

9. The fluid seal assembly of claim 2, wherein the first contacting member is annular in shape.

10. The fluid seal assembly of claim 9, wherein the first contacting member is comprised of a plurality of angled sections positioned together end-to-end.

11. The fluid seal assembly of claim 2, wherein the second contacting member is annular in shape.

12. The fluid seal assembly of claim 11, wherein the second contacting member is comprised of a plurality of angled sections positioned together end-to-end.

13. The fluid seal assembly of claim 2, wherein the first and second members are positioned co-planar with one another.

14. The fluid seal assembly of claim 2, wherein the first contacting member seals the gap between the outer perimeter of the second member and the inner edge of the circular hole passing through the first member.

15. The fluid seal assembly of claim 2, wherein, the first contacting member is made of a flexible low friction material.

16. The fluid seal assembly of claim 15, wherein, the first contacting member is made of ultra-high molecular weight polyethylene.

17. The fluid seal assembly of claim 15, wherein, the second contacting member is made of a flexible low friction material.

18. The fluid seal assembly of claim 17, wherein, the second contacting member is made of ultra-high molecular weight polyethylene.

19. The fluid seal assembly of claim 2, wherein the plurality of support assemblies comprise:

a plurality of biasing mechanisms attached to the same member to which the first contacting member is attached;

a plurality of pivot members attached to the same member to which the first contacting member is attached;

a plurality of sealing support members, each sealing support member being connected to one of the biasing mechanisms and positioned to pivot about one of the pivot members; and a sealing ring, wherein the plurality of sealing support members together biases the sealing ring against the first contacting member.

20. The fluid seal assembly of claim 2, wherein the first and second members comprise opposite sides of a clarifier launder.

21. A method of providing a fluid seal between a first and second member, wherein the first member has a circular hole passing therethrough and the second member has a circular shape, the second member being positioned such that a gap is present between an outer perimeter of the second member and an inner edge of the circular hole passing through the first member; comprising:

attaching a first contacting member to only one or the other of the first and second members such that the first contacting member spans across the gap;

attaching a second contacting member to the other of the first and second members to which the first contacting member is not attached; and biasing the first contacting member against second contacting member.

22. The method of claim 21, further comprising:

rotating the first member relative to the second member.

* * * * *